United States Patent
Stevens

(10) Patent No.: US 6,877,543 B2
(45) Date of Patent: Apr. 12, 2005

(54) SEALING ASSEMBLY

(75) Inventor: David J. Stevens, Port Melbourne (AU)

(73) Assignee: Cryovac Australia Pty. Ltd., Victoria (AU)

( * ) Notice: Subject to any disclaimer, the term of this patent is extended or adjusted under 35 U.S.C. 154(b) by 0 days.

(21) Appl. No.: 10/333,109

(22) PCT Filed: Jul. 27, 2001

(86) PCT No.: PCT/AU01/00929

§ 371 (c)(1),
(2), (4) Date: Sep. 25, 2003

(87) PCT Pub. No.: WO02/10019

PCT Pub. Date: Feb. 7, 2002

(65) Prior Publication Data

US 2004/0068958 A1 Apr. 15, 2004

(30) Foreign Application Priority Data

Jul. 31, 2000 (AU) .............................................. PQ9106

(51) Int. Cl.⁷ .............................................. B32B 31/00
(52) U.S. Cl. ........................ 156/581; 156/580; 53/479; 493/206
(58) Field of Search ................................ 156/580, 581, 156/583.1; 53/477, 479, 375.8, 375.9, 387.1, 387.3, 387.4; 493/189, 206, 209

(56) References Cited

U.S. PATENT DOCUMENTS

| 2,916,864 | A | | 12/1959 | Meissner | 53/180 |
| 4,067,175 | A | | 1/1978 | Vinokur | 53/373 |
| 4,516,384 | A | | 5/1985 | Imperiale | 53/459 |
| 4,563,862 | A | * | 1/1986 | McElvy | 53/552 |
| 5,826,405 | A | * | 10/1998 | Killinger et al. | 53/459 |
| 5,987,854 | A | * | 11/1999 | Killinger et al. | 53/459 |
| 6,167,681 | B1 | * | 1/2001 | Yano et al. | 53/477 |
| 6,282,871 | B1 | * | 9/2001 | Killinger et al. | 53/459 |

* cited by examiner

Primary Examiner—James Sells
(74) Attorney, Agent, or Firm—Mark B. Quatt

(57) ABSTRACT

A sealing assembly (10) for sealing flexible packaging materials comprising: a sealing mechanism for sealing the packaging material; and a spreading mechanism for spreading the packaging material to be sealed prior to sealing, the spreading mechanism including at least two pair of opposed spreading members (15a, 15b), each pair having opposing converging contact edges (17a, 17b) which engage either side of the packaging material during spreading; wherein the spreading members are mounted for relative movement between a first open orientation and a second closed orientation such that, as the spreading members travel from said first to said second orientation, the contact edges initially contact the packaging material at convergent ends of the contact edges and then proceed to contact the packaging material along the length of the contact edges to divergent ends thereof, and wherein subsequently or simultaneously the spreading members engage the packaging material between the contact edges and travel transversely relative to the packaging material to spread the packaging material.

13 Claims, 6 Drawing Sheets

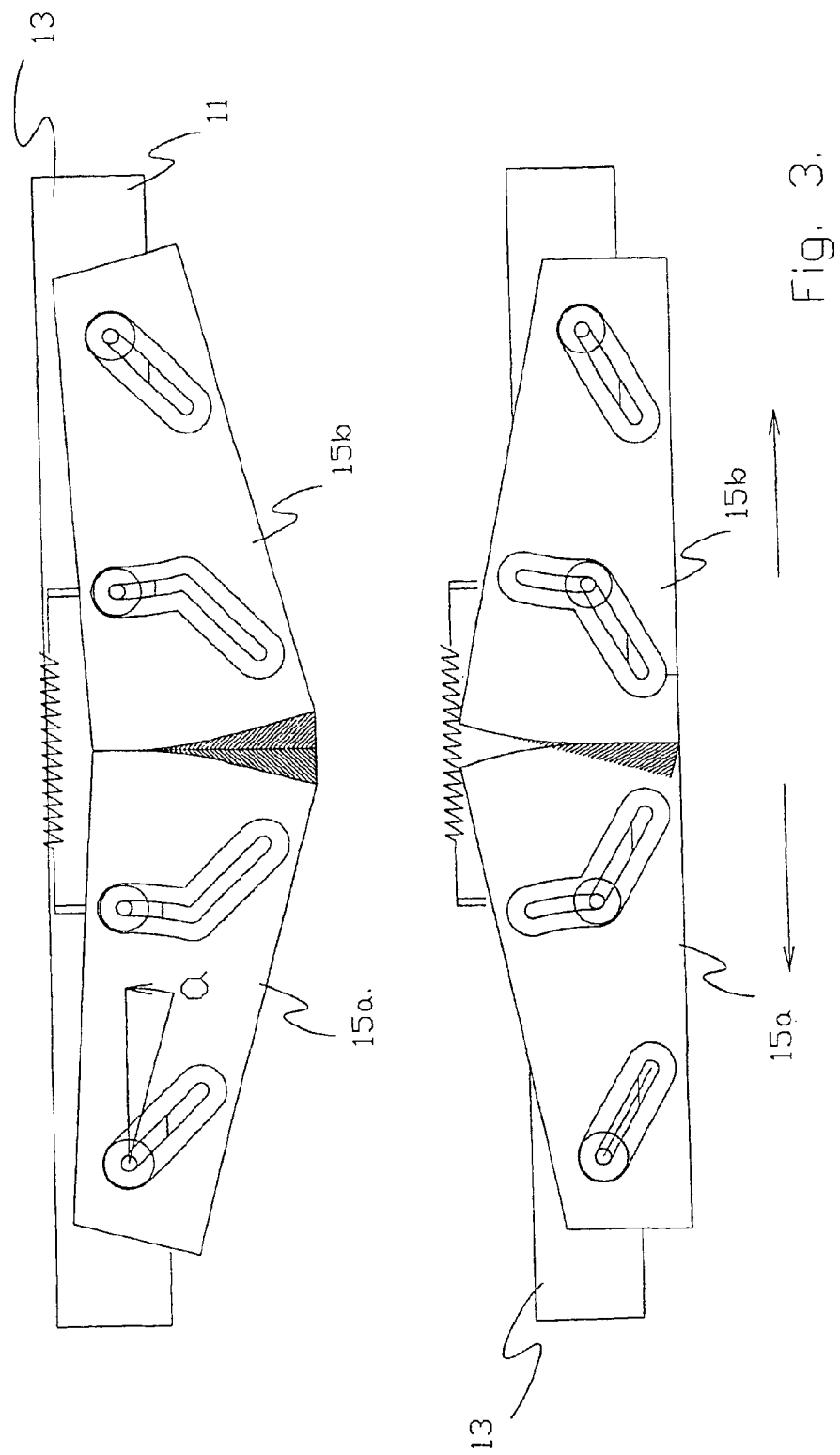

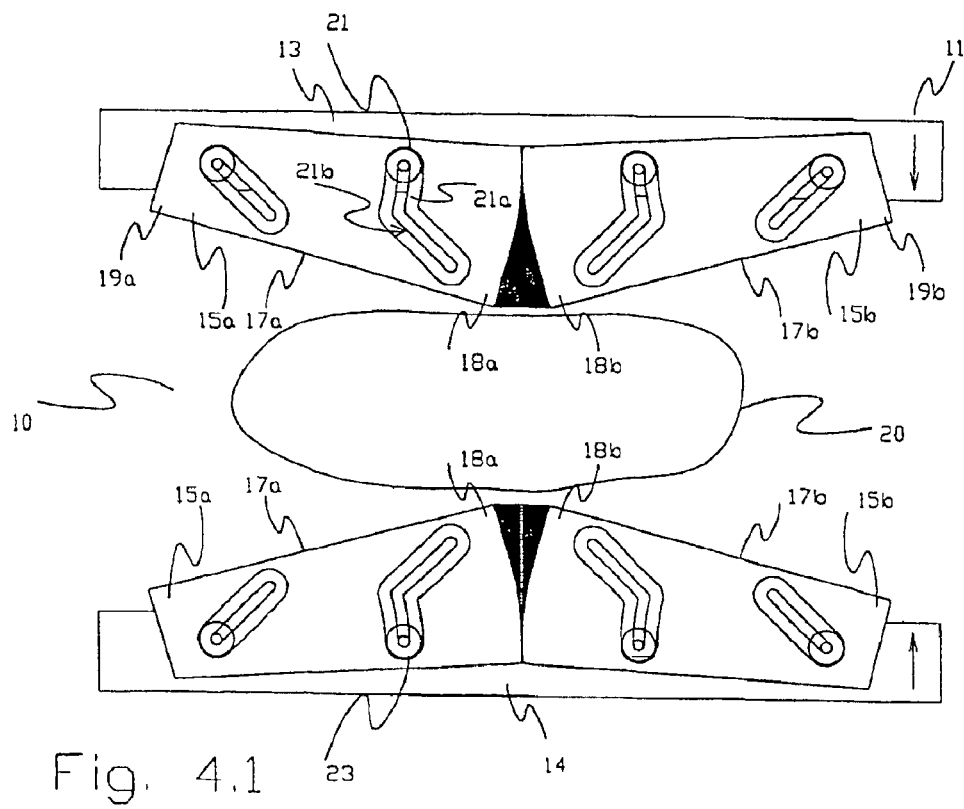
Fig. 4.1
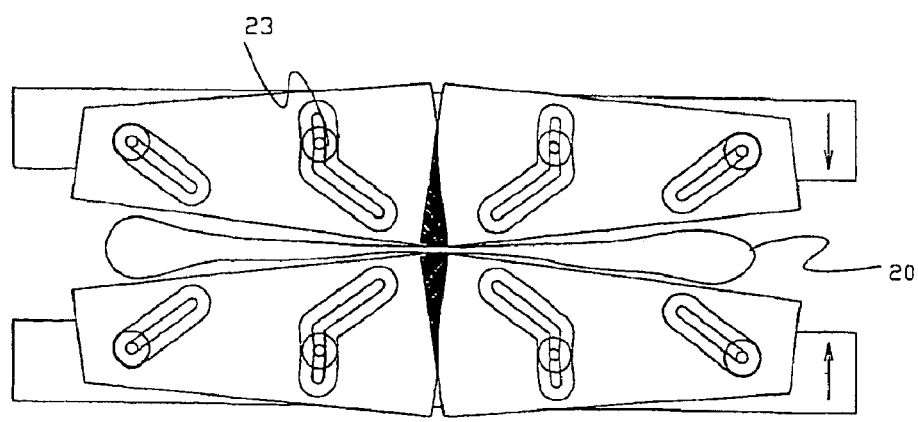
Fig. 4.2

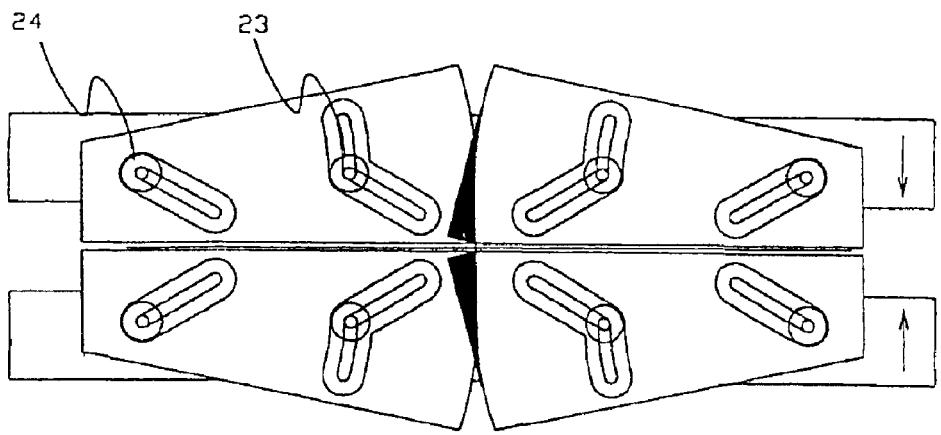
Fig. 4.3
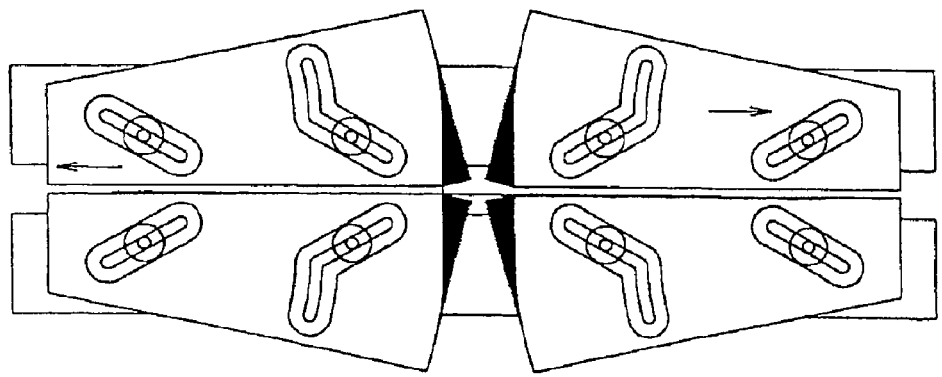
Fig. 4.4
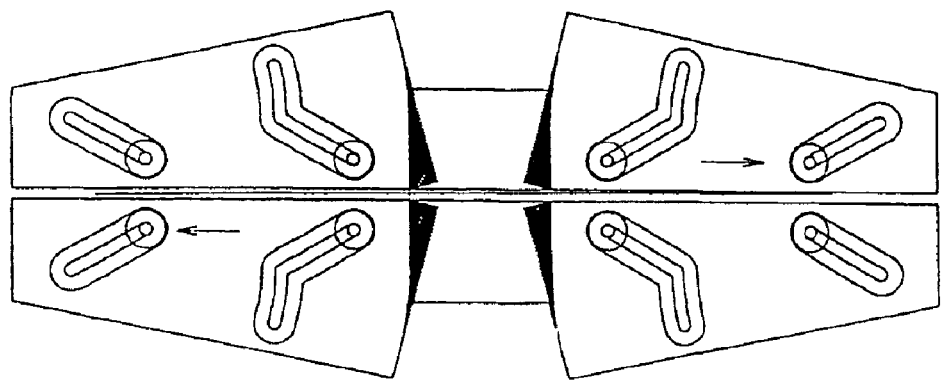
Fig. 4.5

SEALING ASSEMBLY

The present invention relates to a sealing assembly for sealing flexible packaging materials. In particular, the invention relates to a sealing assembly which includes a spreading mechanism which advantageously facilitates spreading of the packaging material prior to sealing to alleviate problems associated with sealing through creases or other inconsistencies in the packaging film.

The sealing of flexible packaging materials is known and is generally employed in the production of, for example, bags. The basis of most packaging operations relies on sealing a flexible packaging material around a product. In the case of packaging using a flexible material, up to four seals may have to be made in the material to ensure that the product is contained in the package. In the sealing process, the two faces of the packaging material must be brought together and bonded. This bonding or sealing process may take many forms. For example, the two faces may be bonded or sealed together using heat or cohesive or adhesive bonding.

In a large proportion of packaging applications with flexible packaging materials, it is a requirement that the seal or bond between the two layers of material be hermetic. This hermetic bond or seal advantageously prevents interaction of the packaged article with the outside environment. This may be very important, for example, in the packaging of products such as food products.

The process of creating a hermetic or high integrity seal can rely on several factors including:

(i) The sealability of the materials being bonded to each other. That is, the ability of the flexible packaging material to bond to itself or any other material being used.

(ii) The mechanism used to join the materials together. For example, in a thermal pressure or heat sealing system, this would include temperature, time and pressure. An adhesive system of sealing may be determined on pressure and time.

(iii) The contact faces of the packaging material being free from creases or any other inconsistency. The removal of creases or inconsistencies allows the contact faces to be in intimate contact promoting even pressure during bonding or sealing.

The sealing assembly of the invention is concerned with the final factor described above and advantageously provides an intimate contact between the contact faces of the packaging material without creases or inconsistencies prior to sealing of the packaging material.

According to the present invention there is provided a sealing assembly for sealing flexible packaging materials comprising:

a sealing mechanism for sealing the packaging material; and a spreading mechanism for spreading the packaging material to be sealed prior to sealing, the spreading mechanism including at least two pair of opposed spreading members, each pair having opposing converging contact edges which engage either side of the packaging material during spreading;

wherein the spreading members are mounted for relative movement between a first open orientation and a second closed orientation such that, as the spreading members travel from said first to said second orientation, the contact edges initially contact the packaging material at convergent ends of the contact edges and then proceed to contact the packaging material along the length of the contact edges to divergent ends thereof, and wherein subsequently or simultaneously the spreading members engage the packaging material between the contact edges and travel transversely relative to the packaging material to spread the packaging material.

In its simplest form, the sealing assembly according to the invention includes two pair of opposed spreading members which, in effect, act as jaw clamps, but which also act, due to their mounting, to initially contact the packaging material and either while closing or subsequent to closing on the packaging material, spread the packaging material to remove creases and inconsistencies. Following this action, the sealing mechanism engages the packaging material between the spreading members and seals or bonds the packaging material. In a preferred embodiment the two pair of spreading members are mounted substantially symmetrically about a substantially central longitudinal axis of the packaging material. In this case, each of the pairs of spreading members preferably initially contacts the packaging material at or close to the central longitudinal axis of the packaging material. That is, the convergent ends of the spreading members are located at or near the central longitudinal axis. Following the initial contact, the spreading members are disposed and mounted such that, as they move together toward the second orientation, the length of the contact edges of the spreading members engage the packaging material until substantially the entire length of the contact edges are in contact with the packaging material. As will be illustrated in the accompanying drawings, this provides a symmetrical engagement of the packaging material from the central point and then transversely across the packaging material to each outer edge of the material.

If the sealing assembly includes only two pair of spreading members, then the sealing mechanism is most preferably positioned immediately next to the spreading members and in parallel alignment with the spreading members. This arrangement is preferred as if the sealing mechanism is located at any substantial distance away from the spreading members, then it may be possible that creases or inconsistencies will re-occur in the packaging material prior to reaching the sealing mechanism even though the spreading mechanism has acted to remove these inconsistencies.

In an alternate and preferred embodiment, the spreading mechanism includes four pairs of opposed spreading members, two of the pairs being mounted parallel to each other and constituting a first side of the spreading mechanism and the other two of said pairs being mounted parallel to each other and constituting a second side of the spreading mechanism, wherein the first and second sides of the spreading mechanism are symmetrical. This arrangement is, in a practical sense, equivalent to two parallel aligned mechanisms, each including the arrangement described above in relation to the simplest form of the invention.

As was the case with the embodiment of the invention including two pair of spreading members, it is preferred that the spreading members of the first and second sides, equating to left and right sides, of the spreading mechanism are mounted such that convergent ends of the contact edges of each pair of spreading members are located at a substantially central longitudinal axis of the packaging material. Again, this arrangement facilitates spreading of the packaging material across its width from an initial central longitudinal axis of the material to either edge.

The sealing mechanism may include any suitable mechanism used in the art. The sealing mechanism may be separate to or integral with the spreading mechanism. For example, in one embodiment the sealing mechanism includes at least one sealing bar which is separate to the spreading mechanism. However, in a preferred embodiment, the sealing mechanism includes a pair of sealing bars, each of the spreading members being mounted on a respective one of the sealing bars such that sealing ribbons which extend along the sealing bars are located between upper and lower pairs of the two pairs of spreading members which constitute the first side of the spreading mechanism and upper and lower pairs of the two pairs of spreading members which constitute the second side of the spreading mechanism. In this sense, the spreading mechanism as a whole, if considered in the longitudinal direction of the packaging material, includes a first set of spreading members comprising two opposed pair of spreading members, two sealing bars each of which includes a sealing ribbon which extends transversely across the packaging material, and finally a second set of spreading members comprising two pair of spreading members which are identical to the first set of spreading members. The upper four spreading members are advantageously mounted relative to an upper one of the sealing bars, while the lower four spreading members are mounted relative to a lower one of the sealing bars.

As has already been mentioned, the movement of the spreading members between the first open orientation and the second closed orientation provides for the initial contact of the spreading members with the packaging material at convergent ends of the spreading members, and the subsequent spreading movement of the spreading members. In a preferred embodiment, each of the spreading members includes a spreading plate having two slot and pin guides for guiding movement of the spreading plates between the first and second orientations. More preferably, the guides include a first inner guide located at the convergent end of each spreading plate and a second outer guide located at the divergent end of each spreading plate. To facilitate initial movement of the spreading members toward the packaging material and subsequent movement of the spreading members in a transverse direction relative to the longitudinal axis of the packaging material, the first guide preferably includes a substantially L-shaped slot having a first portion which extends from an outer edge of the support plate towards the contact edge of the support plate and a second portion which extends at an angle from the first portion to facilitate transverse movement of the spreading plate to the second orientation, and the second guide preferably includes a slot which extends from the outer edge of the spreading plate towards the contact edge of the spreading plate and which is substantially parallel to the second portion of the first guide.

The pressure exerted by the spreading members on the packaging material while travelling from the first to the second orientation, and in particular when travelling transversely to the longitudinal axis of the packaging material while spreading the packaging material, should be sufficient to facilitate spreading of the packaging material, but should not be so great as to cause grabbing of the packaging material or any stretching of the packaging material. In this sense, it is preferred that the contact edges of the spreading members include a surface of rigid short fibre brush.

In order to provide desired tensioning to the spreading members, in a preferred embodiment the upper and lower pairs of the two pairs of spreading members which constitute the first side of the spreading mechanism and the upper and lower pairs of the two pairs of spreading members which constitute the second side of the spreading mechanism, each include a tensioning device for controlling tension between each upper pair and lower pair of spreading members during movement of the spreading members between the first and second orientations. In a particularly preferred embodiment, the tensioning device includes a spring.

The contact edges of each pair of spreading members may converge at any suitable angle so as to ensure that the convergent ends of the contact edges initially contact the packaging material, followed by the remainder of the contact edges. In a preferred embodiment, the spreading members are disposed such that they rotate inwardly relative to the substantially central longitudinal axis of the packaging material between the first and second orientations of the spreading members. Preferably, the angle of rotation of each of the spreading members between the first and second orientation is from about 5° to about 45°. However, particularly good results have been found where the angle of rotation of each of the spreading members between the first and second orientation is from about 15° to about 20°.

A more detailed description of preferred embodiments of the sealing assembly according to the invention will now be described with reference to the accompanying drawings in which:

FIG. 3 illustrates the upper portion of FIG. 1 between its first orientation and an intermediate orientation as it travels to its second orientation;

Figure 1:
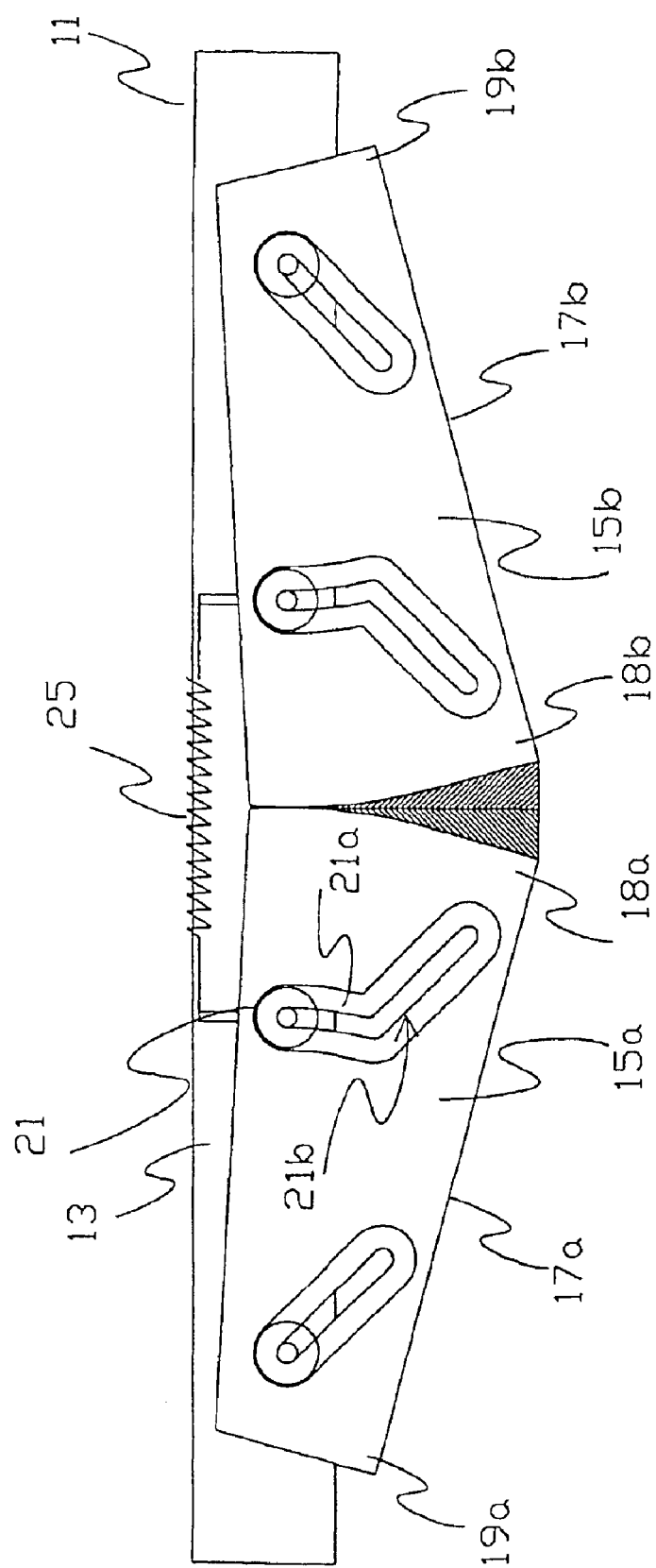
FIG. 1 illustrates a side elevational view of an upper half of a sealing assembly including an upper pair of spreading members.
Figure 2:
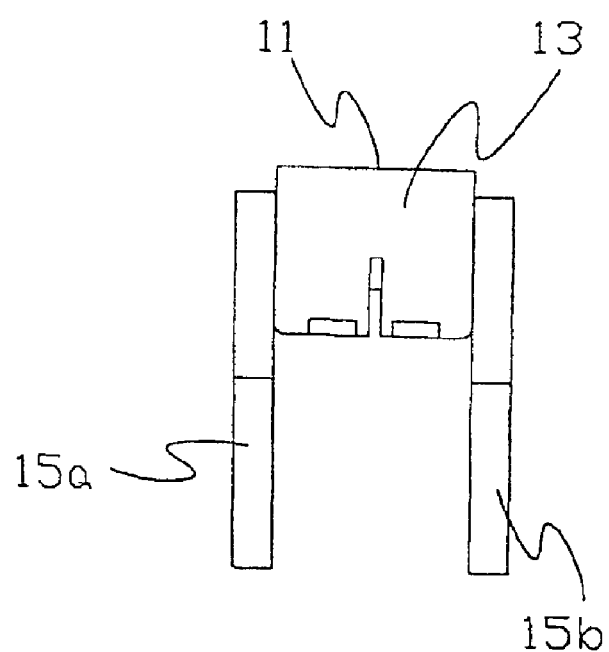
FIG. 2 illustrates an end elevation of the upper portion of FIG. 1.
Figure 5:
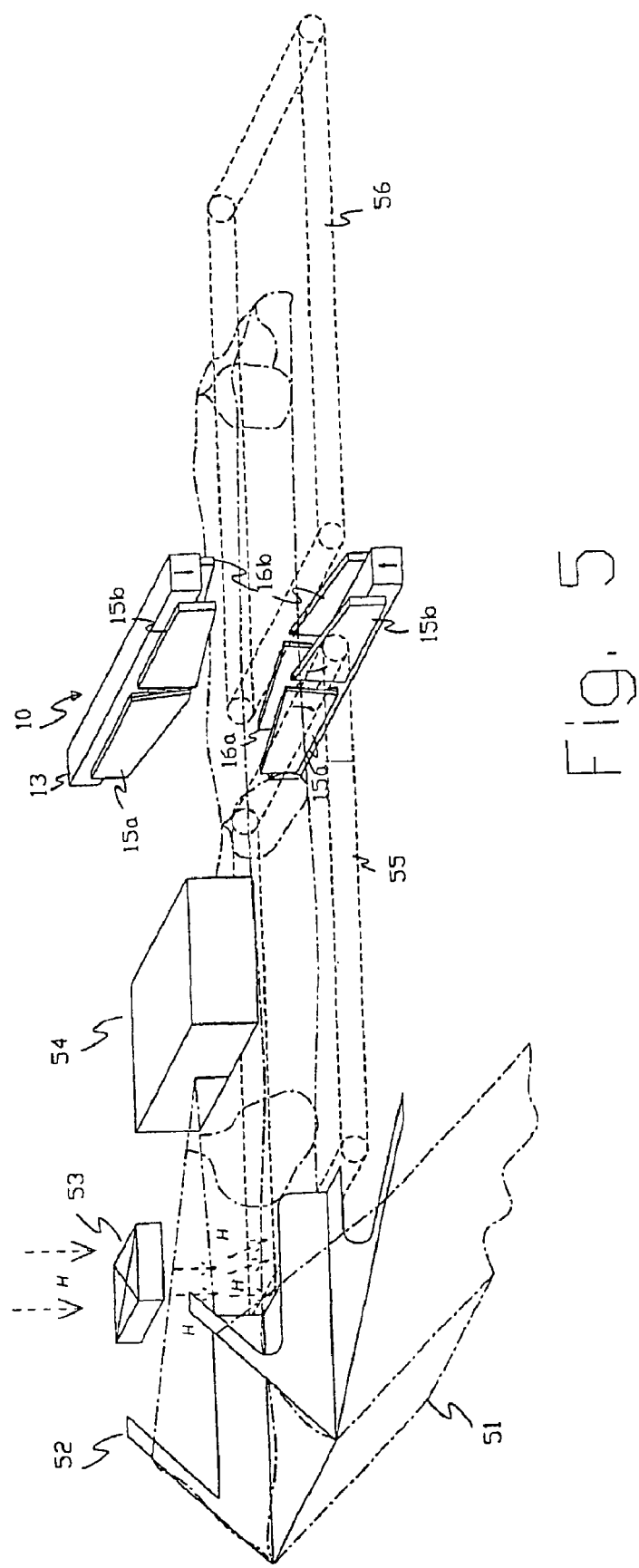

FIGS. 4.1, 4.2, 4.3, 4.4 and 4.5 illustrate a complete sealing assembly with its spreading members travelling from the first orientation to the second orientation with packaging material therebetween; and FIG. 5 illustrates a packing system which incorporates the sealing assembly.

Referring to FIGS. 1–4, the sealing assembly 10 includes an upper portion 11 and a lower portion 12 which include upper and lower sealing bars 13, 14 respectively. Spreading plates 15a, 15b are mounted on the upper and lower sealing bars 13, 14 and constitute a first pair of spreading plates 15a and a second pair of spreading plates 15b. The spreading plates 15a, 15b may also be described in terms of an "upper pair" which includes those mounted on sealing bar 13 and a "lower pair" which refers to those mounted on the lower sealing bar 14. Any reference herein to "upper" and "lower" pairs of spreading plates should be understood to have this meaning. Furthermore, as can be readily appreciated from FIG. 2, the sealing assembly 10 includes a second set of spreading plates 16a, 16b which are located on the opposite side of sealing bars 13, 14 to the side on which spreading plates 15a, 15b are mounted. These spreading plates 16a, 16b act in a symmetrical fashion to spreading plates 15a, 15b and, as such, reference to movement of spreading plates 15a, 15b should also be considered to be referenced to movement to the second set of spreading plates 16a, 16b. These spreading plates 16a, 16b are best illustrated in FIG. 5.

Spreading plates 15a and 15b are mounted on upper and lower sealing bars 13, 14 such that contact edges 17a, 17b of the spreading plates are disposed at an angle and converge towards a central longitudinal axis of the packaging material 20. Convergent ends 18a, 18b, due to the convergence of the contact edges 17a, 17b, are the first points to contact the packaging material 20 as the sealing bars 13, 14 move towards each other.

Movement of the spreading plates 15a, 15b is controlled by guides 21 and 22. Each of the spreading plates includes the guides 21, 22. As such, these guides will be now described singularly, but it should be understood that this description applies to each of the spreading plates of the sealing assembly.

The first guide 21 is substantially L-shaped and includes a first portion 21a and a second portion 21b. The first portion 21a extends from an outer edge of the spreading plate 15a towards the contact edge 17a of the spreading plate. The second portion 21b of guide 21 extends at an angle from the first portion 21a toward the convergent end 18a of the spreading plate 15a. The second guide 22 is smaller than the first guide 21 and is located more toward the divergent end 19a of the spreading plate 15a. The second guide 22 again extends from the outer edge of the spreading plate 15a, although the second guide is inset from the outer edge, towards the contact edge 17a. Further, the second guide 22 is substantially parallel to the second portion 21b of the first guide 21. Each of the guides 21, 22 includes a slot and pin arrangement. Advantageously, the pin includes a bearing arrangement to facilitate substantially frictionless movement of the pin through the slot.

Referring to FIG. 4, the travel of the assembly 10 from the first orientation through to the second orientation is depicted. In the first orientation, as illustrated in FIG. 4.1, the spreading plates 15a, 15b are spaced apart with the packaging material 20 located therebetween in an expanded form. That is, gas flow is used to produce a positive pressure in the packing material tube relative to the surrounding area so as to partially inflate the tube. As the spreading plates 15a, 15b move towards each other, convergent ends 18a, 18b of the spreading plates initially contact the packaging material 20 at a substantially central longitudinal axis of the packaging material. This forces the packaging material tube to be substantially collapsed as illustrated in FIG. 4.2, wherein gas within the tubing is forced to outer edges of the tubing. At this point, pins 23 in the first guide 21 are travelling within the slot of the first portion 21a. As the pins 23 move through slot 21a of the first guide 21, the contact edges 17a, 17b of the spreading plates 15a, 15b engage the packaging material to its transverse edges until the spreading plates 15a, 15b reach an intermediate orientation as depicted in FIG. 4.3. At this point, the pins 23 are located at the juncture of the first portion 21a and the second portion 21b of the first guide 21. However, the pins 24 which are located in slots of the second guides have not moved along the second guides. The angle of rotation of the spreading plates 15a, 15b between the first orientation and the intermediate orientation is advantageously between 15° and 200.

In order to spread the packing material 20 which is now engaged by the length of the contact edges 17a, 17b, the spreading plates 15a, 15b must travel in transverse directions relative to the longitudinal axis of the packaging material 20. That is, the pair of spreading plates 15a travel toward one transverse edge of the packaging material 20 while the other pair of spreading plates 15b travel towards an opposing edge of the packaging material. This movement is best illustrated in FIG. 4.4 and results in the spreading plates 15a, 15b reaching the second orientation depicted in FIG. 4.5. During movement between the intermediate orientation seen in FIG. 4.3 and the second orientation seen in FIG. 4.5, pins 23, 24 travel in the slots of the second portion 21b of the first guide 21 and the slots of the second guide 22 respectively.

The spreading plates 15a, 15b are tensioned so that the pressure applied to the packaging material 20 when the spring plates are moving from the intermediate orientation to the second orientation is sufficient to remove creases and inconsistencies in the packaging material 20, but is not so great so as to stretch the packaging material or grab the packaging material. Preferably, a spring 25 is provided as a tensionsing device between each upper and lower pair of plates 15a, 15b so as to suitably control the pressure applied to the packaging material 20 by the contact edges 17a, 17b of the spreading plates 15a, 15b. Furthermore, to ensure that the packaging material 20 is not pinched by the convergent ends 18a, 18b of the spreading plates 15a, 15b of the spreading plates 15a, 15b, the convergent ends are bevelled so that there is no gap between pairs of upper and lower plates prior to initial contact with the packaging material 20.

Referring to FIG. 5, a packaging system is illustrated which includes a feed of packaging film 51 which is fed to a forming frame 52. The packaging material is then inflated by means of a gas flow H from an inflation apparatus fan or gas exhaust port 53, the packaging material then passes through a fin or long seal apparatus 54 which forms the packaging material into a tube.

Product is inserted into the packaging material at any suitable time, generally before forming the packaging material into a tube. Product is fed by means of a main transport conveyor belt 55. The sealing assembly 10 acts to seal the packing material at either end of the product as described hereabove. The final packaged product is conveyed by means of an outfeed conveyor 56.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in Australia.

Those skilled in the art will appreciate that the invention described herein is susceptible to variations and modifications other than those specifically described. It is to be understood that the invention includes all such variations and modifications which fall within its spirit and scope. The invention also includes all the steps, features, compositions and compounds referred to or indicated in this specification, individually or collectively, and any and all combinations of any two or more of said steps or features.

The claims defining the invention are as follows:

1. A sealing assembly for sealing flexible packaging materials comprising:
   a sealing mechanism for sealing the packaging material; and
   a spreading mechanism for spreading the packaging material to be sealed prior to sealing, the spreading mechanism including at least two pair of opposed spreading members, each pair having opposing converging contact edges which engage either side of the packaging material during spreading;
   wherein the spreading members are mounted for relative movement between a first open orientation and a second closed orientation such that, as the spreading members travel from said first to said second orientation, the contact edges initially contact the packaging material at convergent ends of the contact edges and then proceed to contact the packaging material along the length of the contact edges to divergent ends thereof, and wherein subsequently or simultaneously the spreading members engage the packaging material between the contact edges and travel transversely relative to the packaging material to spread the packaging material.

2. A sealing assembly according to claim 1, wherein said two pair of spreading members are mounted substantially symmetrically about a central longitudinal axis of the packaging material.

3. A sealing assembly according to claim 1, wherein said spreading mechanism includes four pairs of opposed spreading members, two of said pairs being mounted parallel to each other and constituting a first side of said spreading mechanism and the other two of said pairs being mounted parallel to each other and constituting a second side of said spreading mechanism, wherein said first and second sides of said spreading mechanism are symmetrical.

4. A sealing assembly according to claim 3, wherein the spreading members of said first and second sides of said spreading mechanism are mounted such that convergent ends of the contact edges of each pair of spreading members are located at a substantially central longitudinal axis of said packaging material.

5. A sealing assembly according to claim 3, wherein the sealing mechanism includes at least one sealing bar which is separate to said spreading mechanism.

6. A sealing assembly according to claim 3, wherein the sealing mechanism includes a pair of sealing bars, each of said spreading members being mounted on a respective one of said sealing bars such that sealing ribbons which extend along said sealing bars are located between upper and lower pairs of the two pairs of spreading members which constitute the first side of the spreading mechanism and upper and lower pairs of the two pairs of spreading members which constitute the second side of the spreading mechanism.

7. A sealing assembly according to claim 1, wherein each of said spreading members includes a spreading plate having 2 slot and pin guides for guiding movement of the spreading plates between said first and second orientations.

8. A sealing assembly according to claim 7, wherein said guides include a first inner guide located at the convergent end of said spreading plate and an outer guide located at the divergent end of said spreading plate.

9. A sealing assembly according to claim 8, wherein the first guide includes a substantially L-shaped slot having a first portion which extends from an outer edge of the support plate towards the contact edge of the support plate and a second portion which extends at an angle from the first portion to facilitate transverse movement of the spreading plate to said second orientation, and wherein the second guide includes a slot which extends from the outer edge of the spreading plate towards the contact edge of the spreading plate and which is substantially parallel to the second portion of the first guide.

10. A sealing assembly according to claim 3, wherein upper and lower pairs of the two pairs of spreading members which constitute the first side of the spreading mechanism and upper and lower pairs of the two pairs of spreading members which constitute the second side of the spreading mechanism each include a tensioning device for controlling tension between each upper and lower pair of the spreading members during movement of the spreading members between the first and second orientations.

11. A sealing assembly according to claim 10, wherein said tensioning device is a spring.

12. A sealing assembly according to claim 1, wherein the angle of rotation of each of said spreading members between said first and second orientation is from about 5° to about 45°.

13. A sealing assembly according to claim 12, wherein the angle of rotation of each of said spreading members between said first and second orientation is from about 15° to about 20°.

* * * * *